United States Patent [19]

Warner et al.

[11] 4,065,645

[45] Dec. 27, 1977

[54] HEADSET

[75] Inventors: Donald E. Warner, North Hollywood; George C. Oyama, Northridge, both of Calif.

[73] Assignee: Audiotronics Corporation, North Hollywood, Calif.

[21] Appl. No.: 735,896

[22] Filed: Oct. 26, 1976

[51] Int. Cl.[2] .............................................. H04M 1/05

[52] U.S. Cl. ................................................. 179/156 R

[58] Field of Search .................................... 179/156 R

[56] References Cited

U.S. PATENT DOCUMENTS

| | | | |
|---|---|---|---|
| 3,681,540 | 8/1972 | Thomson | 179/156 R |
| 3,787,899 | 1/1974 | Krawagna | 179/156 R |

*Primary Examiner*—William C. Cooper

*Attorney, Agent, or Firm*—Charles H. Schwartz

[57] ABSTRACT

A headset including a pair of earpieces and a head strap extending from one earpiece to the other earpiece, and with the head strap including end portions and the earpieces each including a cavity and with each end portion extending into the cavity in the earpiece and with the ends of the end portions enclosed within the earpieces, and with the end portions of the head strap slideable within the cavities in the earpieces for providing adjustment of the headset and including stop members to limit the travel of the end portions, and with wires extending through the head strap from one portion to the other end portion and into the earpieces and with the wires fully contained within the head strap and the earpieces.

7 Claims, 4 Drawing Figures

HEADSET

The present invention is directed to a headset and specifically to a tamperproof headset for use by children such as in a classroom. Headsets that are for use by children generally are low cost but even though these headsets are low cost, they must be rugged and relatively tamperproof. It is also important that this type of headset be adjustable so that the headset can be used by children of different age groups.

Prior art headsets include a head strap and earpieces and have been made adjustable by sliding end portions of the head strap relative to the earpieces but with the end portions external to the earpieces. These external end portions protrude and can be damaged by the child. Also, the wires which carry the electrical signals normally extend from the end portions of the head strap and are also external. The child can damage the wires and thereby render the headset inoperable. In addition, the wires to the earpieces normally are positioned adjacent the head strap and sometimes the prior art devices include a cover member which snaps on and off the head strap so as to cover the wires. A child can remove the cover and damage the wires which, again, renders the headset inoperable.

It is, therefore, desirable to provide for a headset that is relatively tamperproof and wherein all of the wires are enclosed in a manner so that they cannot be tampered with by the child. In addition, the headset is adjustable but with the adjustment portions internal within the earpieces so that the child cannot damage the headset.

In the headset of the present invention, the head strap is formed from two molded pieces each including longitudinal recesses and with the recesses forming a cavity. The wires are fitted in the recesses and then the two pieces are welded together such as through ultrasonic welding. The end portions of the head strap fit into cavities in the earpieces so that the adjustment of the headset is accomplished by sliding the end portions within the interior of the earpieces. The wires coming out of the ends of the head strap are thereby located completely within the earpieces. The end portions of the head strap act as extensible members to produce the desired adjustment and each of the end portions include an integral lip to act as a stop. The end portions each slide over a flexible portion forming a part of the wall of the cavity within the earpiece.

The present invention therefore provides for a headset wherein the wires are completely enclosed within the head strap and earpieces and with the end portions of the head strap adjustable within the earpieces so that the headset is almost completely tamperproof. The advantage of this design is that there is almost nothing that a child can pry loose or break as with the prior art headsets.

A clearer understanding of the present invention will be had with reference to the following description and drawings wherein FIG. 1 is a perspective view of a headset constructed in accordance with the teachings of the present invention;

Figure 1:
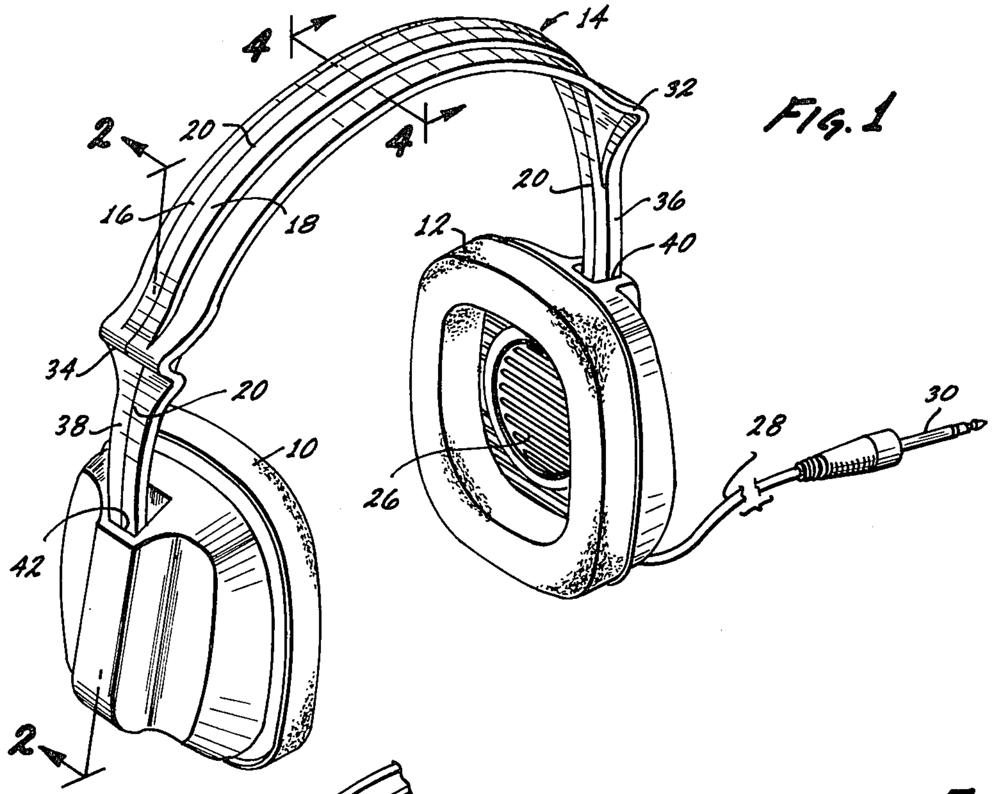
Figure 4:
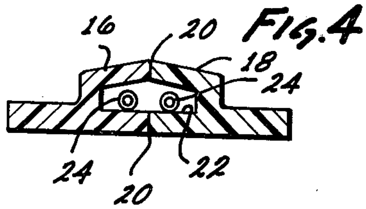
FIG. 4 is a cross-sectional view of the head strap taken along lines 4—4 in FIG. 1 showing the two molded pieces forming the cavity for the wires.

In FIG. 1, a perspective view of the headset constructed in accordance with the present invention is shown. The headset can be seen to include a pair of earpieces 10 and 12 interconnected by a head strap 14. The head strap 14 is formed of two molded halves 16 and 18 which are attached along a seam 20. This may be seen in further detail in FIG. 4. As shown in FIG. 4, the two molded halves each include a recess so that the two recesses form an internal cavity 22. The cavity 22 encloses wires 24 which wires are used to provide electrical signals to speakers such as speaker 26 shown in FIG. 1. The electrical signals are initially supplied to the headset through a coaxial wire 28 having a jack 30 at its end.

Figure 2:
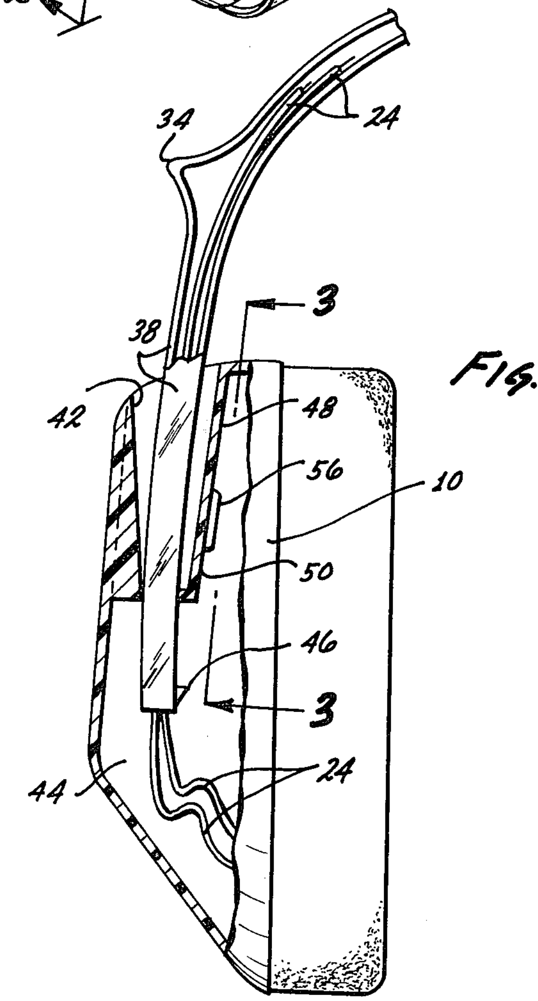
FIG. 2 is a cross-sectional view of one of the earpieces and the end of the head strap taken along lines 2—2 of FIG. 1 and with the other earpiece being substantially identical.

The head strap 14 also includes flared out portions 32 and 34. The end portions of the head strap 14, designated as portions 36 and 38, extend into cavities 40 and 42 which cavities are within the interior of the earpieces 10 and 12 as shown in FIG. 2. The seam 20 extends from one end portion 36 through to the other portion 38 so as to form the unitary head strap 14 composed of the two molded pieces 16 and 18.

As can be seen in FIG. 2 the cavity 42 (which is identical to the cavity 40) is tapered to allow for a rocking of the end portion 38 within the cavity 42. This provides for a pivoting of the end portion within the cavity so as to allow for adjusting the slope of the earpiece relative to the head strap. In addition, the end portion 38 may slide into the interior 44 of the earpiece 10 as shown in FIG. 2. This provides for an additional adjustment of the headset to fit the head strap and earpieces to the particular listener. The adjustments of the head strap relative to the earpieces are shown by the arrows in FIG. 1.

Figure 3:
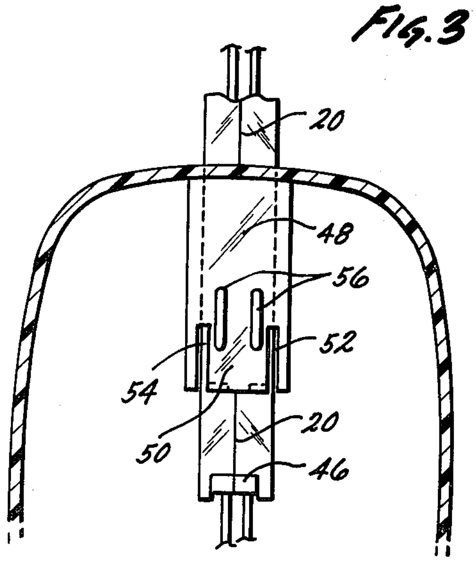
FIG. 3 is a cross-sectional view of the earpiece and the end of the head strap taken along lines 3—3 of FIG. 2.

The end portion 38 includes an integral lip 46 which acts as a stop so that the end portion 38 cannot be completely pulled out of the interior 44 or the cavity 42. The cavity 42 also includes a wall member 48, a portion of which forms a flexible member 50. The flexible member 50 is formed by slotting the wall member 48 as shown by slots 52 and 54 in FIG. 3. This flexible member 50 provides for a friction fit against the end portion 38 so that the end portion 38 may be slid in and out of the interior 44 of the earpiece 10 but with the flexible member 50 maintaining the end portion 38 in position. A pair of integral bridge members 56 bridge the flexible area and extend over the flexible member 50 so as to prevent breaking and to provide for additional support to the flexible member.

The wires 24 extend from the end of the end portion 38 of the head strap 14 as shown in FIG. 2 and there is a sufficient amount of slack in these wires so that when the head strap is fully extended the wires still provide connection to the speaker, such as speaker 26 shown in FIG. 1. As indicated above the wires 24 extend completely through the head strap in the cavity 22 shown in FIG. 4 which cavity extends from one end 38 to the other end 36 of the head strap 14. The head strap is formed by joining the two portions 14 and 16 along seam 20 and this joining may be accomplished either by an adhesive or by welding. For example, it has been found that the two portions 16 and 18 may be ultrasonically welded together with the wires in place to provide for a secure joining of these two portions without causing any damage to the wires 24.

It can be seen therefore that the present invention is directed to a headset which is fully adjustable and is relatively tamperproof by a child. Specifically, the head strap contains the wires in a cavity and the adjustment of the end portions of the head strap is provided for in an interior portion of the earpieces. No wires are exposed for the child to tamper with, no end portions of the head strap are exposed for the child to tamper with, and all of the wires are completely enclosed other than the lead to the headset itself. The present invention, therefore, has almost nothing that a child can pry loose or break as with prior art headsets.

Although the invention has been described with reference to a particular embodiment, it should be appreciated that various adaptations and modifications may be made and the invention is only to be limited by the appended claims.

We claim:

1. A headset including a pair of earpieces and a continuous head strap extending from one earpiece to the other earpiece, the continuous head strap including end portions and the earpieces each including a cavity and with each end portion extending into the cavity in the earpiece and with the ends of the end portions enclosed within the earpieces and with the continuous head strap forming a flexible member for supporting the earpieces at the end portions, the end portions of the head strap slideable within the cavities in the earpieces for providing adjustment of the headset and including stop members to limit the travel of the end portions, and wires extending through the head strap from one end portion to the other end portion and into the earpieces and with the wires fuly contained within the continuous head strap and the earpieces.

2. The headset of claim 1 wherein the head strap is formed of two elongated molded members each having a longitudinal recessed portion and with the two molded members joined together to have the recessed portions forming an enclosed cavity for the wires.

3. The headset of claim 1 wherein the head strap includes an integral lip portion at the end of the end portions to engage a portion of the earpiece to provide a stop to prevent the end portion from being pulled out of the earpiece.

4. The headset of claim 1 wherein the earpiece includes a flexible portion bearing against the end portion of the head stap to allow for sliding movement of the head strap against the flexible portion while retaining the head strap in an adjusted position.

5. The headset of claim 4 wherein the flexible portion is formed as part of the cavity into which the end portion extends and with the flexible portion formed by slotting a wall section of the cavity to provide a free standing flexible portion.

6. The headset of claim 5 wherein an integral raised portion of the wall is adjacent the slotted portion of the wall of the cavity to support the flexible portion to prevent breaking.

7. The headset of claim 1 wherein the head strap is formed from two members each containing a recess extending along the length of the member to contain the wires and with the two members ultrasonically welded together with the wires in the recesses to form a unitary head strap with wires in an internal cavity and with the wires extending from the ends of the head strap.

* * * * *

US004065645B1

REEXAMINATION CERTIFICATE (2007th)

United States Patent [19]

[11] B1 4,065,645

Warner et al.

[45] Certificate Issued May 18, 1993

[54] HEADSET

[75] Inventors: Donald E. Warner, North Hollywood; George C. Oyama, Northridge, both of Calif.

[73] Assignee: Audiotronics Corporation, North Hollywood, Calif.

Reexamination Request:
No. 90/002,703, Apr. 27, 1992

Reexamination Certificate for:
Patent No.: 4,065,645
Issued: Dec. 27, 1977
Appl. No.: 735,896
Filed: Oct. 26, 1976

[51] Int. Cl.[5] ............ H04M 1/05
[52] U.S. Cl. ............ 381/183
[58] Field of Search ............ 381/183, 187; 379/430

[56] References Cited

U.S. PATENT DOCUMENTS 2,586,644 2/1952 Gilbert ............ 381/183
3,744,057 7/1973 Luceri ............ 2/146
3,787,899 1/1974 Krawagna .
3,866,275 2/1975 Van Amburg ............ 2/265
3,891,810 6/1975 Hayashi ............ 381/183
3,939,310 2/1976 Hodges .
3,971,900 7/1976 Foley ............ 439/6

FOREIGN PATENT DOCUMENTS 2008288 2/1971 Fed. Rep. of Germany .
2132817 5/1972 Fed. Rep. of Germany .

OTHER PUBLICATIONS

"Audio" Magazine, vol. 58, No. 6, Jun. 1974.

*Primary Examiner*—Jin F. Ng

[57] ABSTRACT

A headset including a pair of earpieces and a head strap extending from one earpiece to the other earpiece, and with the head strap including end portions and the earpieces each including a cavity and with each end portion extending into the cavity in the earpiece and with the ends of the end portions enclosed within the earpieces, and with the end portions of the head strap slidable within the cavities in the earpieces for providing adjustment of the headset and including stop members to limit the travel of the end portions, and with wires extending through the head strap from one portion to the other end portion and into the earpieces and with the wires fully contained within the head strap and the earpieces.

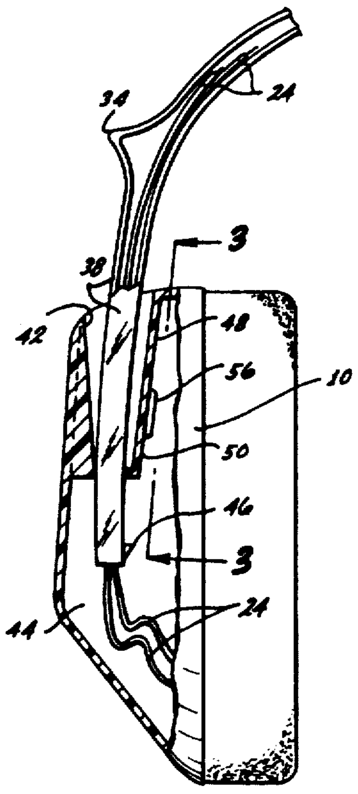

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

Claims 1-7 are cancelled.

* * * * *